US008642176B2

(12) United States Patent  
Boven et al.

(10) Patent No.: US 8,642,176 B2
(45) Date of Patent: Feb. 4, 2014

(54) PLASTIC LAMINATES AND METHODS FOR MAKING THE SAME

(75) Inventors: Geert Boven, Steenbergen (NL); Johannes Martinus Dina Goossens, Bergen op Zoom (NL); Josef Gerardus Berndsen, Rilland (NL); Cornelis Johannes Gerardus Maria van Peer, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 1587 days.

(21) Appl. No.: 12/133,016

(22) Filed: Jun. 4, 2008

(65) Prior Publication Data

US 2008/0318039 A1 Dec. 25, 2008

Related U.S. Application Data

(63) Continuation-in-part of application No. 11/765,003, filed on Jun. 19, 2007, now abandoned.

(51) Int. Cl.
*B32B 17/10* (2006.01)

(52) U.S. Cl.
USPC ............................ 428/412; 428/411.1

(58) Field of Classification Search
USPC ............................................ 528/26
See application file for complete search history.

(56) References Cited

U.S. PATENT DOCUMENTS

| | | | |
|---|---|---|---|
| 2,999,835 A | 9/1961 | Goldberg | |
| 3,153,008 A | 10/1964 | Fox | |
| 3,322,719 A | 5/1967 | Peilstocker | |
| 3,334,154 A | 8/1967 | Kim | |
| 3,764,457 A | 10/1973 | Chang et al. | |
| 4,001,184 A | 1/1977 | Scott | |
| 4,121,014 A | 10/1978 | Shaffer | |
| 4,123,436 A | 10/1978 | Holub et al. | |
| 4,126,730 A | 11/1978 | Molari, Jr. | |
| 4,128,694 A * | 12/1978 | Fabel et al. | 428/412 |
| 4,131,575 A | 12/1978 | Adelmann et al. | |
| 4,201,828 A | 5/1980 | Triebel et al. | |
| 4,243,719 A | 1/1981 | Holmes | |
| 4,305,982 A | 12/1981 | Hirsch | |
| 4,321,777 A | 3/1982 | Sauret et al. | |
| 4,351,920 A | 9/1982 | Ariga et al. | |
| 4,537,828 A | 8/1985 | Gomez | |
| 4,668,574 A | 5/1987 | Bolton et al. | |
| 4,683,172 A | 7/1987 | LeGrand et al. | |
| 4,774,143 A | 9/1988 | Gondela et al. | |
| 4,816,504 A | 3/1989 | Bailey et al. | |
| 4,845,193 A | 7/1989 | Umemura et al. | |
| 4,879,183 A | 11/1989 | Mannheim | |
| 4,908,083 A | 3/1990 | Hall | |
| 4,914,143 A | 4/1990 | Patel | |
| 5,019,443 A | 5/1991 | Hall | |
| 5,103,336 A | 4/1992 | Sieloff | |
| 5,108,835 A | 4/1992 | Hahnsen et al. | |
| 5,208,080 A | 5/1993 | Gajewski et al. | |
| 5,212,014 A | 5/1993 | David et al. | |
| 5,262,475 A | 11/1993 | Creasy | |
| 5,286,537 A | 2/1994 | Oita et al. | |
| 5,318,850 A | 6/1994 | Pickett et al. | |
| 5,318,853 A | 6/1994 | Bayha et al. | |
| 5,501,910 A | 3/1996 | Smith | |
| 5,589,272 A | 12/1996 | Braun et al. | |
| 5,608,027 A | 3/1997 | Crosby et al. | |
| 5,783,307 A | 7/1998 | Fagerburg et al. | |
| 5,814,712 A | 9/1998 | Gallucci et al. | |
| 5,846,363 A | 12/1998 | Haverkamp | |
| 5,846,659 A | 12/1998 | Lower et al. | |
| 6,087,007 A | 7/2000 | Fujii et al. | |

(Continued)

FOREIGN PATENT DOCUMENTS

| | | |
|---|---|---|
| EP | 0041229 A1 | 12/1981 |
| EP | 0389291 B1 | 9/1990 |

(Continued)

OTHER PUBLICATIONS

International Search Report; International Application No. PCT/IB2008/052327; International Filing Date: Jun. 12, 2008; Date of Mailing: Nov. 13, 2008; 7 pages.
Written Opinion of the International Searching Authority; International Application No. PCT/IB2008/052327; International Filing Date: Jun. 12, 2008; Date of Mailing: Nov. 13, 2008; 7 pages.
Final Office Action for U.S. Appl. No. 11/765,003; Date of Mailing: Mar. 3, 2011; 9 Pages.

(Continued)

*Primary Examiner* — Callie Shosho
*Assistant Examiner* — Patrick English
(74) *Attorney, Agent, or Firm* — Cantor Colburn LLP

(57) ABSTRACT

In one embodiment, a multilayer structure comprises: an initial terpolymer layer, a second layer comprising plastic and/or glass, a polycarbonate layer, and an adhesive layer. The initial terpolymer layer comprises a polycarbonate terpolymer derived from a first dihydroxy compound, a second dihydroxy compound, and a third dihydroxy compound, the first dihydroxy compound has Structure (A)

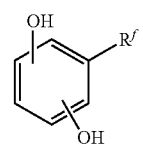

(A)

wherein $R^f$ is a hydrogen or $CH_3$; the second dihydroxy compound has Structure (A) and is different from the first dihydroxy compound; and the third dihydroxy compound does not have Structure (A), and wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer.

19 Claims, No Drawings

(56) References Cited

U.S. PATENT DOCUMENTS

| | | | |
|---|---|---|---|
| 6,287,674 B1 | 9/2001 | Verlinden et al. | |
| 6,333,114 B1 | 12/2001 | Tobita et al. | |
| 6,506,487 B2 | 1/2003 | Nagai | |
| 6,790,929 B2* | 9/2004 | Silvi et al. | 528/198 |
| 6,870,025 B2 | 3/2005 | McCloskey et al. | |
| 7,115,700 B2 | 10/2006 | Cella et al. | |
| 7,482,423 B2 | 1/2009 | Jansen et al. | |
| 7,645,851 B2 | 1/2010 | Berndsen et al. | |
| 2003/0032760 A1* | 2/2003 | Inoue et al. | 528/196 |
| 2003/0149223 A1* | 8/2003 | McCloskey et al. | 528/196 |
| 2005/0261460 A1 | 11/2005 | Cella et al. | |
| 2006/0142527 A1* | 6/2006 | Glasgow et al. | 528/26 |
| 2008/0318039 A1 | 12/2008 | Boven et al. | |
| 2008/0318053 A1* | 12/2008 | Boven et al. | 428/412 |
| 2010/0159211 A1 | 6/2010 | Blackburn et al. | |
| 2010/0160575 A1 | 6/2010 | Goossens et al. | |
| 2010/0160594 A1 | 6/2010 | Brack et al. | |

FOREIGN PATENT DOCUMENTS

| | | |
|---|---|---|
| EP | 1024952 B1 | 6/2002 |
| EP | 1345764 B1 | 9/2003 |
| WO | 2006/057771 A2 | 6/2006 |
| WO | 2007/040973 A1 | 4/2007 |

OTHER PUBLICATIONS

Non-Final Office Action for U.S. Appl. No. 11/765,003; Date of Mailing: Oct. 8, 2010; 16 Pages.

Restriction Requirement for U.S. Appl. No. 11/765,003; Date of Mailing: Jul. 8, 2010; 8 Pages.

* cited by examiner

PLASTIC LAMINATES AND METHODS FOR MAKING THE SAME

CROSS-REFERENCE TO RELATED APPLICATIONS

This application is a continuation-in-part application of U.S. patent application Ser. No. 11/765,003, filed Jun. 19, 2007, now abandoned, which is incorporated by reference herein in its entirety.

BACKGROUND

The present disclosure relates generally to plastic (sheet) laminates, and more specifically to a plastic and glass laminate with a polymer therebetween.

Glass laminated products have contributed to society for almost a century. Beyond the well known, every day automotive safety glass used in windshields, glass laminates are used in most forms of the transportation industry. They are utilized as windows for trains, airplanes, ships, and nearly every other mode of transportation. Safety glass is characterized by high impact and penetration resistance and does not scatter glass shards and debris when shattered. Glass laminates find widespread use in architectural applications, as well.

A glass laminate typically consists of a sandwich of two glass sheets or panels bonded together with an interlayer of a polymeric film or sheet which is placed between the two glass sheets, typically plasticized polyvinyl butyral (PVB). One or both of the glass sheets may be replaced with optically clear rigid polymeric sheets such as, for example, sheets of polycarbonate materials. However, when PVB laminated polycarbonate is exposed to a warm humid environment the contact area between the polycarbonate and PVB becomes hazy. As a result of this the material looses optical clarity and a reduction of impact performance is observed.

There are two basic technologies laminating glass and polycarbonate. One process is based on polyurethane film adhesives in an autoclave process. This process has cost drawbacks, namely the costs of the polyurethane adhesive film used between the glass and the polycarbonate, and the costs of the autoclave process step. In the other process, the adhesive is a curable liquid, like UV curable acrylates or urethanes. This process suffers from delamination at the polyurethane/glass interface after aging.

Hence there is a continual need for glass-plastic laminates with good adhesion.

BRIEF SUMMARY

Disclosed herein are laminates and methods of making the same.

In one embodiment, a multilayer structure comprises: an initial terpolymer layer, a second layer comprising plastic and/or glass, a polycarbonate layer, and an adhesive layer. The initial terpolymer layer is located between the polycarbonate layer and the second layer, and the adhesive layer is located between the initial terpolymer layer and the second layer. The initial terpolymer layer comprises a polycarbonate terpolymer derived from a first dihydroxy compound, a second dihydroxy compound, and a third dihydroxy compound, wherein: the first dihydroxy compound has Structure (A)

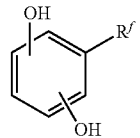

(A)

wherein $R^f$ is a hydrogen or $CH_3$; the second dihydroxy compound has Structure (A) and is different from the first dihydroxy compound; and the third dihydroxy compound does not have Structure (A), and wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer. The adhesive layer comprises a material selected from the group consisting of PVB, EVA, and combinations comprising at least one of the foregoing.

In an embodiment, a method for making a multilayered structure, comprises: disposing a initial terpolymer layer between a polycarbonate layer and an adhesive layer and disposing a second layer on a side of the adhesive layer opposite the initial terpolymer layer, wherein the second layer comprises plastic and/or glass. The initial terpolymer layer comprises a polycarbonate terpolymer derived from a first dihydroxy compound, a second dihydroxy compound, and a third dihydroxy compound, wherein: the first dihydroxy compound has Structure (A)

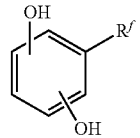

(A)

wherein $R^f$ is a hydrogen or $CH_3$; the second dihydroxy compound has Structure (A) and is different from the first dihydroxy compound; and the third dihydroxy compound does not have Structure (A), and wherein the sum of the mole percent of all of the first dihydroxy compound and the second dihydroxy compound is greater than or equal to 45% relative to the sum of the molar amounts of all of the first dihydroxy compound, the second dihydroxy compound, and the third dihydroxy compound in the polycarbonate terpolymer. The adhesive layer comprises a material selected from the group consisting of PVB, EVA, and combinations comprising at least one of the foregoing.

The above described and other features are exemplified by the following figures and detailed description.

DETAILED DESCRIPTION

Glass laminated with PVB has improved impact, and may also exhibit sound reduction and UV and solar energy control, versus just glass. The replacement of sheet(s) of glass with polycarbonate enables weight reduction. However, as mentioned above, when such a laminate is exposed to a warm humid environment the contact area between the homopolymer of bisphenol-A polycarbonate (further shown as PC) and PVB becomes hazy, losing optical clarity and experiencing a reduction of impact performance. The plasticizer used in commercially available PVB films is aggressive to polycarbonate. In lifetime, especially at elevated temperatures and high humidity, it migrates into the PC layer and causes haze and loss of ductility. Hence, for applications that employ polycarbonate and PVB layers, there is no direct and simple solution for lamination that retains optical clarity. For example, in order to overcome the potential generation of haze, an extra layer of thermoplastic polyurethane (TPU) film can be introduced, e.g., a structure could be: PC/TPU/glass/PVB/glass. This, however, requires several additional layers to retain separation of the PVB and the PC.

It has been discovered, however, that using a polymer layer, e.g., a terpolymer layer comprising of the polycarbonate of hydroquinone (HQ), methyl-hydroquinone (MeHQ), and bisphenol-A (BPA), (further shown as terpolymer) attains haze resistance. For example, PVB laminated terpolymer disks, and PVB laminated to a co-extruded terpolymer-PC sheet, maintains optical clarity and high impact resistance upon exposure to elevated temperature (e.g., temperatures of greater than or equal to about room temperature (23° C.) at humid conditions, e.g. relative humidity higher than 50%. In other words, the intermediate layer of terpolymer makes more direct lamination with PVB possible. As a result, multilayer articles comprising PC-terpolymer-PVB-glass, as well as many layer articles having repeating sections of PVB-glass and/or repeating sections of PC-terpolymer-PVB, such as PC-terpolymer-PVB-glass-PVB-glass or PC-terpolymer-PVB-terpolymer-PC have excellent properties.

Disclosed herein are plastic-plastic and glass-plastic laminates and methods of making the same. These laminates comprise PVB between the laminate sheets (e.g., glass and plastic, or plastic and plastic) as well as a terpolymer between the PVB and any polycarbonate sheet. Not to be limited by theory, the terpolymer is believed to prevent degradation of the polycarbonate PVB interface by plasticizer in the PVB.

In one embodiment, a multilayer structure comprises: an initial terpolymer layer, a second layer comprising plastic and/or glass, a polycarbonate layer, and an adhesive layer. The initial terpolymer layer is located between the polycarbonate layer and the second layer, and the adhesive layer is located between the initial terpolymer layer and the second layer. The initial terpolymer layer comprises a polycarbonate terpolymer derived from a first dihydroxy compound, a second dihydroxy compound, and a third dihydroxy compound, wherein the first dihydroxy compound has Structure (A)

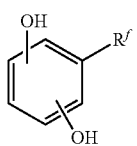

(A)

wherein $R^f$ is a hydrogen or $CH_3$; the second dihydroxy compound (e.g., Structure (B)) has Structure (A) and is different from the first dihydroxy compound; and the third dihydroxy compound (e.g., Structure (C)) does not have Structure (A), and wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer. For example, Structure B can be derived from Structure (D) set forth below. The adhesive layer comprises a material selected from the group consisting of PVB, EVA, and combinations comprising at least one of the foregoing. The multilayer structure can further comprise an additional terpolymer layer, wherein the additional terpolymer layer comprises an additional polycarbonate terpolymer comprising structures derived from: a first dihydroxy compound having Structure (A)

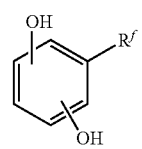

(A)

wherein $R^f$ is a hydrogen or $CH_3$; a second dihydroxy compound (e.g., Structure (B)) which has Structure (A) and is different from the first dihydroxy compound; and a third dihydroxy compound (e.g., Structure (C)) which does not have Structure (A), wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the additional polycarbonate terpolymer. The second layer can comprise polycarbonate, and the initial terpolymer layer can be in physical contact with both the polycarbonate layer and the adhesive layer, and the additional terpolymer layer can be in physical contact with both the adhesive layer and the second layer.

The initial terpolymer layer can comprise a polycarbonate formed from hydroquinone, methyl hydroquinone, and BPA, and can be in physical contact with both the polycarbonate layer and the adhesive layer, and can further comprise phosphoric acid or phosphorous acid, e.g., about 1 ppm to about 15 ppm phosphoric acid or phosphorous acid, or specifically about 5 ppm to about 15 ppm phosphoric acid or phosphorous acid. The initial terpolymer layer can comprise a sufficient amount of the phosphoric acid or phosphorous acid to attain, in the multilayer structure, a flexed plate impact retention at maximum force of greater than or equal to about 65% after two weeks of exposure to 70° C. and 95% relative humidity, or, more specifically, greater than or equal to about 85%. In another embodiment the initial terpolymer layer comprises phosphorous acid. Flexed plate impact, also known as Flex plate impact or multi-axial impact is measured according to IS 6603-2 (2000). The maximum force is the maximum force measured during the test at a specific sample. Impact retention at maximum force designates the maximum force measured at comparable samples with and without treatment. The retention is calculated as a percentage of the maximum force measured on a treated sample relative to an untreated sample.

The adhesive layer can also be in physical contact with the second layer, and/or the adhesive layer can comprise PVB.

In an embodiment, a method for making a multilayered structure, comprises: disposing a initial terpolymer layer between a polycarbonate layer and an adhesive layer and disposing a second layer on a side of the adhesive layer opposite the initial terpolymer layer, wherein the second layer comprises plastic and/or glass. The initial terpolymer layer comprises a polycarbonate terpolymer derived from a first dihydroxy compound, a second dihydroxy compound, and a third dihydroxy compound, wherein: the first dihydroxy compound has Structure (A)

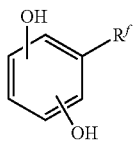

(A)

wherein $R^f$ is a hydrogen or $CH_3$; the second dihydroxy compound has Structure (A) and is different from the first dihydroxy compound; and the third dihydroxy compound does not have Structure (A), and wherein the sum of the mole percent of all of the first dihydroxy compound and the second dihydroxy compound is greater than or equal to 45% relative to the sum of the molar amounts of all of the first dihydroxy compound, the second dihydroxy compound, and the third dihydroxy compound in the polycarbonate terpolymer. The adhesive layer comprises a material selected from the group consisting of PVB, EVA, and combinations comprising at least one of the foregoing.

In one embodiment, the laminate can comprise: a polycarbonate sheet, a second sheet (e.g., glass and/or plastic), PVB between the polycarbonate sheet and the second sheet, and a terpolymer between (and optionally in physical contact with) the PVB and the polycarbonate sheet.

The second sheet can be a glass sheet. The glass can be any glass type, e.g. soda-lime, borosilicate (e.g., Pyrex borosilicate, sodium borosilicate, etc.), E-glass, S-glass, and so forth, as well as combinations comprising at least one of the foregoing. The glass should have a sufficient thickness to provide structural integrity and stiffness to the laminate, depending on the application. For example, in some applications, the glass can have a thickness of greater than or equal to about 1 millimeter (mm), or, specifically, about 1 mm to about 100 mm, or, more specifically, about 2 mm to about 50 mm, or, yet more specifically, about 2 mm to about 15 mm.

In one embodiment the second sheet can be a plastic sheet. The plastic can be any plastic comprising the desired transparency, e.g., thermoplastic(s), thermoset(s), and combinations comprising at least one of the foregoing. For example, a plastic having a light transmission of greater than or equal to 50%, or, more specifically, greater than or equal to about 65%, or, even more specifically, greater than or equal to about 80% can be used, determined via ASTM D-1003-00 as set forth below. Possible plastics include polycarbonate, thermoplastic acrylic polymers, poly(ethylene terephthalate) (PET), polyamide (e.g., transparent polyamide having a light transmission of greater than or equal to 50%), olefins, as well as combinations comprising at least one of the foregoing, such as poly (ethylene terephthalate copolymers (APET, PETG), cyclic olefin copolymers, acrylic olefin copolymers, and so forth. In some embodiments, the plastic sheet(s) also comprise color, e.g., pigment(s) and/or dye(s). The colored plastic sheet can have a light transmission of greater than or equal to 10%, or, more specifically, greater than or equal to about 20%, or, even more specifically, greater than or equal to about 30%.

In one embodiment, the plastic sheet is formed from a thermoplastic polycarbonate resin, such as Lexan® resin, commercially available from SABIC Innovative Plastics B.V., Bergen op Zoom, The Netherlands. Thermoplastic polycarbonate resin that can be employed in producing the plastic sheet includes, aromatic polycarbonates as well as combinations comprising aromatic polycarbonate, such as polyester carbonate copolymer. In another embodiment, the thermoplastic polycarbonate resin is an aromatic homo-polycarbonate resin such as the polycarbonate resins described in U.S. Pat. No. 4,351,920 to Ariga et al.

For example, some possible polycarbonates can be prepared by reacting a dihydric phenol with a carbonate precursor, such as phosgene, a haloformate, or a carbonate ester. Generally, such carbonate polymers comprise recurring structural units of the Formula I:

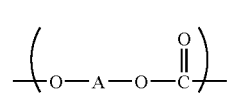

(I)

wherein A is a divalent aromatic radical of the dihydric phenol employed in the polymer producing reaction. In one embodiment, the polycarbonate can have an intrinsic viscosity (as measured in methylene chloride at 25° C.) of about 0.30 to about 1.00 deciliter/gram (dL/g). The dihydric phenols employed to provide such polycarbonates can be mononuclear or polynuclear aromatic compounds, containing as functional groups two hydroxy radicals, each of which is attached directly to a carbon atom of an aromatic nucleus. Possible dihydric phenols include, for example, 2,2-bis(4-hydroxyphenyl)propane (bisphenol A), hydroquinone, resorcinol, 2,2-bis(4-hydroxyphenyl)pentane, 2,4'-(dihydroxydiphenyl)methane, bis(2-hydroxyphenyl)methane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxydiphenyl)sulfone, bis (3,5-diethyl-4-hydroxyphenyl)sulfone, 2,2-bis(3,5-dimethyl-4-hydroxyphenyl)propane, 2,4'-dihydroxydiphenyl sulfone, 5'-chloro-2,4'-dihydroxydiphenyl sulfone, bis(4-hydroxyphenyl)diphenyl sulfone, 4,4'-dihydroxydiphenyl ether, 4,4'-dihydroxy-3,3'-dichlorodiphenyl ether, 4,4-dihydroxy-2,5-dihydroxydiphenyl ether, and the like, and mixtures thereof. Other possible dihydric phenols for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

The polycarbonate resins can be manufactured by known processes, such as, for example and as mentioned above, by reacting a dihydric phenol with a carbonate precursor, such as phosgene, a haloformate, or a carbonate ester, in accordance with methods set forth in the above-cited literature and in U.S. Pat. No. 4,123,436 to Holub et al., or by transesterification processes such as are disclosed in U.S. Pat. No. 3,153,008 to Fox, as well as other processes.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized combinations of linear polycarbonate and a branched polycarbonate. Moreover, combinations of any of the above materials can be employed to provide the polycarbonate resin.

The polycarbonates can be branched or linear and generally will have a weight average molecular weight (Mw) of about 10,000 to about 200,000 grams per mole (g/mol), specifically about 20,000 to about 100,000 g/mol as measured by gel permeation chromatography as is set forth below. The polycarbonates can employ a variety of end groups to improve performance, such as bulky mono phenols, including cumyl phenol.

The term thermoplastic acrylic polymers, as used herein, is meant to embrace within its scope those thermoplastic polymers resulting from the polymerization of one or more acrylic acid ester monomers as well as methacrylic acid ester monomers. These monomers are represented by the general Formula (II):

wherein W is hydrogen or a methyl radical and $R^g$ is an alkyl radical, or, specifically, an alkyl radical comprising carbon atoms in a range of about 1 and about 20. Some non-limiting examples of alkyl groups represented by $R^f$ include methyl, ethyl, n-propyl, isopropyl, n-butyl, isobutyl, sec-butyl, tert-butyl, pentyl, isopentyl, hexyl, and the like.

Some non-limiting examples of acrylic acid ester monomers represented by Formula II include: methyl acrylate, isopropyl acrylate, n-propyl acrylate, n-butyl acrylate, isobutyl acrylate, 2-ethylhexyl acrylate, and the like. Some non-limiting examples of methacrylic acid ester monomers represented by Formula II include: methyl methacrylate, ethyl methacrylate, butyl methacrylate, hexyl methacrylate, isobutyl methacrylate, propyl methacrylate, and the like, as well as combinations comprising at least one of the foregoing.

Copolymers of the above acrylate and methacrylate monomers are also included within the term thermoplastic acrylic polymers as it appears herein. The thermoplastic acrylic polymer can be a copolymer of poly(methyl methacrylate/methacrylic acid). The polymerization of the monomeric acrylic acid esters and methacrylic acid esters to provide the thermoplastic acrylic polymers may be accomplished by any of the known polymerization techniques. The thermoplastic acrylic polymers typically have an inherent viscosity of less than or equal to about 0.300 centimeters cubed per gram ($cm^3 g^{-1}$), and more typically, less than or equal to about 0.250 $cm^3 g^{-1}$, and most typically, less than or equal to about 0.200 $cm^3 g^{-1}$.

Mixtures of two or more of the aforedescribed thermoplastic acrylic polymers, e.g., two or more different acrylic homopolymers, two or more different acrylic copolymers, two or more different methacrylic homopolymers, two or more different methacrylic copolymers, an acrylic homopolymer and a methacrylic homopolymer, an acrylic copolymer and a methacrylic copolymer, an acrylic homopolymer and a methacrylic copolymer, and an acrylic copolymer and a methacrylic homopolymer, and reaction products thereof, can also be used.

The specific thickness of the plastic sheet(s) is dependent upon the particular use of the laminate, e.g., the degree of structural integrity that is desired from the plastic sheet(s), as well as the particular composition of each of the plastic sheet(s). In some embodiments, the plastic sheet(s) can have a thickness of about 0.50 millimeter (mm) to about 18 mm, or, more specifically, about 0.75 mm to about 15 mm or, even more specifically, about 1.0 mm to about 12 mm.

On one or both sides of the polycarbonate sheet(s) is a terpolymer layer. The terpolymer layer can comprise repeat units derived from hydroquinone, methyl hydroquinone, bisphenol A (BPA), as well as combinations comprising at least one of the foregoing, such as those disclosed in commonly assigned patents: U.S. Pat. No. 7,115,700 to Cella et al., and U.S. Pat. No. 6,870,025 to McCloskey et al. These terpolymers can, for example, be prepared by the melt reaction of the aforementioned compounds with an ester-substituted diaryl carbonate such as bis-methyl salicyl carbonate.

The dihydroxy compounds include dihydroxy aromatic compound(s) such as resorcinol, methylresorcinol, hydroquinone, and methylhydroquinone. The polycarbonate terpolymer thus comprises repeat units derived from resorcinol, methylresorcinol, hydroquinone, and/or methylhydroquinone, as well as combinations comprising at least one of the foregoing. For example, the terpolymer layer can comprise a polycarbonate terpolymer derived from a first dihydroxy compound, a second dihydroxy compound, and a third dihydroxy compound, wherein the first dihydroxy compound has Structure (A)

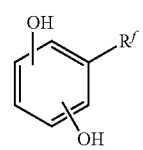

wherein $R^f$ is a hydrogen or $CH_3$; the second dihydroxy compound has Structure (A) and is different from the first dihydroxy compound; and the third dihydroxy compound does not have Structure (A), and wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer.

The polycarbonate terpolymer can comprise repeat units derived from a variety of dihydroxy aromatic compounds in addition to resorcinol, methylresorcinol, hydroquinone, and methylhydroquinone. For example, the polycarbonates can also comprise repeat units derived from dihydroxy aromatic compounds such as bisphenols having Structure D:

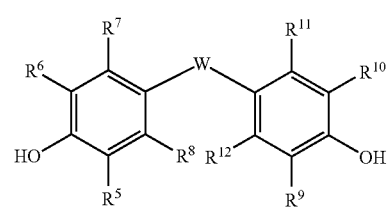

wherein $R^5$-$R^{12}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ aryl radical, W is a bond, an oxygen atom, a sulfur atom, a $SO_2$ group, a $C_6$-$C_{20}$ aromatic radical, a $C_6$-$C_{20}$ cycloaliphatic radical, or the group of Structure E:

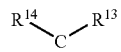

wherein $R^{13}$ and $R^{14}$ are independently a hydrogen atom, $C_1$-$C_{20}$ alkyl radical, $C_4$-$C_{20}$ cycloalkyl radical, or $C_4$-$C_{20}$ aryl radical, or $R^{13}$ and $R^{14}$ together form a $C_4$-$C_{20}$ cycloaliphatic ring which is optionally substituted by $C_1$-$C_{20}$ alkyl, $C_6$-$C_{20}$ aryl, $C_5$-$C_{21}$ aralkyl, $C_5$-$C_{20}$ cycloalkyl groups, or a combination comprising at least one of the foregoing.

The terpolymer described above is disposed between the polymer sheet (e.g., polycarbonate sheet) and the adhesive.

The terpolymer layer can have a sufficient thickness to maintain the desired optical clarity upon exposure to heat and humidity. For example, the terpolymer layer have a thickness of greater than or equal to about 80 micrometers, or, specifically, about 80 micrometers to about 5 mm, or, more specifically, about 100 micrometers to 1 mm, or, yet more specifically, about 100 micrometers to about 500 micrometers, and even more specifically, about 100 micrometers to about 250 micrometers.

The adhesive used between the polymer (e.g., polycarbonate) sheet and the second sheet can be a polymer such as polyvinyl butyral ("PVB"), ethylene-vinyl acetate copolymer (EVA), and so forth, as well as combinations comprising at least one of the foregoing. Depending upon the technique of forming the multilayer article, the adhesive can be in the form of a sheet (e.g., for use in lamination), a liquid, or a combination comprising at least one of the foregoing.

For example, the laminate can be formed by placing a PVB layer between the terpolymer layer and the second sheet. The terpolymer layer can be formed by co-extruding the polycarbonate sheet with the terpolymer layer, or a layer of terpolymer can be formed separately and can be disposed between the PVB and the polycarbonate sheet. The PVB layer is typically sized and positioned so as to either extend beyond or be flush with the periphery of the two sheets. Air is then eliminated from the engaging surfaces, and the assembly is subjected to elevated temperature and pressure (e.g., in an autoclave) to fusion bond the PVB and the sheets into a laminate suitable for use in the window structure. After the rigid sheets are bonded together, any excess PVB extending out beyond the periphery of the rigid sheets is typically trimmed off.

The following examples are merely exemplary, not limiting, and are provided to further explain the laminate and method of making the laminate.

EXAMPLES

The test standards employed herein are set forth in Table 1 below. Unless specifically set forth to the contrary, these standards were used throughout this application.

TABLE 1

Test Procedures

| Test | Standard (year) | Details |
|---|---|---|
| Tensile bars | ISO 3167 (2002) | Type A, thickness 4 mm |
| Tensile Elongation | ISO 527-2 (1993) | 50 mm/min |
| Environmental Stress Cracking | ISO 4599 (1997) | |
| Weight Average Molecular Weight (Mw) | Internal method | as measured by gel permeation chromatography (GPC), using a crosslinked styrene-divinylbenzene column, a refractive index analyzer and calibrated to polycarbonate references. GPC samples are prepared at a concentration of about 1 mg/ml, and are eluted at a flow rate of about 1.5 ml/min. |
| Flexed Plate Impact | ISO 6603-2 (2000) | |
| Light Transmission (LT) | ASTM D1003-00 | Procedure A measured, e.g., using a HAZE-GUARD DUAL from BYK-Gardner, using and integrating sphere (0°/diffuse geometry), wherein the spectral sensitivity conforms to the CIE standard spectral value under standard lamp D65 |
| Haze | ASTM D1003-00 | Procedure A, measured, e.g., using a HAZE-GUARD DUAL from BYK-Gardner, using and integrating sphere (0°/diffuse geometry), wherein the spectral sensitivity conforms to the CIE standard spectral value under standard lamp D65 |
| Yellowness Index (YI) | ASTM D1925 (1988) | | mm/min = millimeters per minute
mg/ml = milligrams per milliliter
ml/min = milliliters per minute.

TABLE 2

| Temperature | |
|---|---|
| Hopper | 40° C. |
| Zone 1 | 280° C. |
| Zone 2 | 290° C. |
| Zone 3 | 300° C. |
| nozzle | 295° C. |
| mold | 90° C. |
| Parameter | |
| Injection Speed | 20 mm/s |
| Holding Time | 10 s |
| Holding Pressure | 10 bar |
| Cooling Time | 20 s |
| Cycle Time | 36 s |

Example 1

Tensile bars were injection molded to be tested for environmental stress cracking. The bar materials were polycarbonate (Mw of about 28,000 g/mol), and BPA/HQ/MeHQ terpolymer (Mw of about 27,000 g/mol), in an amount of 33 mole percent (mol %), 34 mol % and 33 mol %, respectively (e.g., 33/34/33). The terpolymer further contained 20 parts per million by weight (ppm) phosphoric, 0.1 wt % pentaerythritol-tetra-stearate (PETS) Loxiol EP8578 from Cognis, and 4.9 wt % polycarbonate (Mw of about 30,000), wherein the weight percentages are based upon the weight of the total formulation (e.g., the terpolymer is present in an amount of about 94.998 wt %). Prior to molding the material is dried at 110° C. for 4 hours. The molding conditions are chosen to be mild on injection speed and after pressure in order to avoid molded in stress. Three PVB lots were tested, two of which were Butacite commercially available from Dupont, and the third PVB lot was Saflex commercially available from Solutia.

In a strain jig, five tensile bars were positioned. The curvature of the jig induced a specific stress level on the tensile bars. A portion of the bars was exposed to PVB by placing a strip of the PVB (thickness 0.7 mm) on top of the tensile bars. In order to prevent evaporation of volatiles, the strain jig was wrapped in alumina foil, placed in an oven (60° C.), and in a climate controlled room (23° C. and 50% relative humidity (RH)) for a specific time as is set forth in Table 3. After this time, the tensile bars were washed with water and left to dry. The tensile bars were inspected for the presence of cracks and optical effects. Tensile elongation was measured for exposed and not exposed materials. The results showed that the terpolymer bars substantially maintained their tensile elongation (e.g., generally greater than 50% retention, or, specifically greater than 60% retention, and even up to greater than 80% retention), whereas the polycarbonate bars had very low retention (all less than 20% retention, and all but one with less than 8% retention).

sealed bag. The duration of lamination was 5 minutes and the applied pressure was 50 kiloNewtons (kN). As a result of this process, the PVB softened and formed a transparent adhesive layer between the two disks. The measured thickness of the sandwich structure is 4.2 mm. The sandwich structures were exposed to a hydrolytic stability test (70° C., 95% Relative Humidity) for two weeks. After two weeks and at intermediate stages, optical properties (delta transmission (i.e., change in transmission) and haze) were measured. Besides optical properties, molecular weight and flexed plate impact on maximum force were measured on unexposed and 14 days exposed samples. The Table 4 sets forth the flex plat impact retention of maximum force (i.e., (100×Ff/Fi; wherein Fi is flexed plate impact on maximum force before exposure (in Newtons) and Ff is flexed plate impact on maximum force after exposure).

TABLE 4

| No. | Formulation composition | Mw (expressed in PC Mw) | | | Flexed plate Impact retention of max force (%) |
|---|---|---|---|---|---|
| | | Initial (g/mol) | After 2 weeks (70° C. and 95% RH) | Delta (%) | |
| 1 | 95% Terpolymer, 0.1% PETS, 4.9% PC, 20 ppm $H_3PO_3$ | 26,709 | 23,999 | 10.1 | 15 |
| 2 | 100% Polycarbonate | 28,230 | 27,072 | 4.1 | 23 |
| 3 | 100% Terpolymer | 27,526 | 26,442 | 3.9 | 52 |

TABLE 3

| | Test condition | | | Tensile elongation retention (%) and observations with: | |
|---|---|---|---|---|---|
| PVB type | Strain | Temperature | Exposure time | Polycarbonate | Terpolymer |
| Saflex | 0.5% | 60° C. | 7 hours | 7% retention Severe cracking | 87% retention OK |
| Butacite Lot 1 | | | | 7% retention Severe cracking | 83% retention OK |
| Butacite Lot 2 | | | | 7% retention Severe cracking | 85% retention OK |
| Saflex | 0.5% | 60° C. | 29 hours | 0% retention Severe cracking | 60% retention OK |
| Butacite Lot 1 | | | | 0% retention Severe cracking | 77% retention OK |
| Butacite Lot 2 | | | | 0% retention Severe cracking | 84% retention OK |
| Saflex | 0.5% | 23° C. | 7 days | 19% retention Small/minor cracking | 71% retention Small/minor cracking |
| Butacite Lot 1 | | | | 3% retention Small/minor cracking | 51% retention Small/minor cracking |
| Butacite Lot 2 | | | | 5% retention Small/minor cracking | 63% retention Small/minor cracking |

Example 2

From polycarbonate and terpolymer described in Example 1 disks (thickness: 1.8 mm, diameter: 9 cm) were molded according molding conditions from Table 2. Next to the two formulations from experiment 1 also a terpolymer based formulation with half the load of phosphorous acid (10 ppm) and a 100% terpolymer formulation were molded to disks. These disks were used for lamination at 110° C. with 0.7 mm PVB (namely Butacite® commercially available from DuPont) in a melt press between two Teflon® coated alumina sheets. Prior to lamination the disks were dried at 110° C. for at least 4 hours. PVB was freshly taken from storage at 5° C. in a TABLE 4-continued

| No. | Formulation composition | Mw (expressed in PC Mw) | | | Flexed plate Impact retention of max force (%) |
|---|---|---|---|---|---|
| | | Initial (g/mol) | After 2 weeks (70° C. and 95% RH) | Delta (%) | |
| 4 | 95% Terpolymer, 0.1% PETS, 4.9% PC, 10 ppm $H_3PO_3$ | 28,943 | 27,746 | 4.1 | 93 |

TABLE 5

Delta transmission and haze
upon exposure to 70° C./95% RH

| Sample | 3 days exposure | | 7 days exposure | | 14 days exposure | |
|---|---|---|---|---|---|---|
| | Delta LT | Delta haze | Delta LT | Delta haze | Delta LT | Delta haze |
| 1 | 0.1 | −2.8 | −0.3 | −2.9 | −1.6 | 1.3 |
| 2 | −5.6 | 40.5 | −17.3 | 61.8 | −29.6 | 83.8 |
| 3 | −0.1 | −1.2 | | | −1.7 | 1.2 |
| 4 | −3.1 | −1.4 | | | −4.9 | −0.2 |

As can be seen from Tables 4 and 5, there is a drastic and unexpected difference in the results obtained when the terpolymer layer was employed between the PC sheet and the PVB, than without the terpolymer layer. For example, in Table 5 it can be seen that the PC sheet had a substantial change in haze over time, 40.5%, 61.8%, and 83.8% (Sample 2). However, the multilayer sheets that used the terpolymer interlayer (e.g., between the PC and the PVB), had a very small change in haze, i.e., a delta haze over time of less than or equal to 10%, or, more specifically, less than or equal to about 5%, or, yet more specifically, less than or equal to 3%. For example, after 14 days of exposure, all samples that used the terpolymer layer (Samples 1, 3, and 4), had a delta haze of less than or equal to 1.5%. This is extraordinary considering the change in haze for the PC sample (Sample 2) under the same conditions and for the same period was 83.8%.

As is evident from Table 4, it was also discovered that by employing phosphorous acid in the terpolymer composition, a dramatic enhancement in impact retention could be attained. Even though the change in weight average molecular weight over two weeks with exposure to 70° C. and 95% relative humidity (RH) was relatively the same for Samples 2, 3, and 4 (e.g., comprising PC, terpolymer, and terpolymer with phosphorous acid, respectively), namely 4.1, 3.9, and 4.1; there was a substantial difference in impact retention. For the PC sample (2), the flexed plate impact retention at maximum force was 23%, and for the terpolymer it was 52%. However, for the terpolymer composition with 10 ppm phosphorous acid, the flexed plate impact retention at maximum force was 93%; a greater than 40% improvement over the pure terpolymer sample (Sample 3), and a greater than 70% improvement over the pure PC sample (Sample 2). It is noted, however, at a concentration of 20 ppm phosphorous acid, the flexed plate impact retention at maximum force was substantially reduced to 15%; a greater than thirty percent reduction from the polycarbonate sample. Consequently, desirably, the terpolymer composition comprises sufficient phosphorous acid to attain a flexed plate impact retention at maximum force of greater than or equal to about 65%, or, specifically, greater than or equal to about 75%, or, more specifically, greater than or equal to about 85%, and, even more specifically, greater than or equal to about 90%, after two weeks of exposure to 70° C. and 95% relative humidity. In some embodiments, the phosphorous acid concentration can be up to about 15 ppm, or, specifically, about 1 ppm to about 15 ppm, or, more specifically, about 5 ppm to about 15 ppm about 8 ppm to about 12 ppm.

Example 3

Solid polycarbonate (Mw about 30,000 g/mol) sheet was extruded at a thickness of 2.75 mm. This material was also used for co-extrusion with the terpolymer described in Example 1. Keeping the total sheet thickness at about 2.75 mm, two co-extrusion layer thicknesses were selected. In one case the co-extrusion layer (terpolymer) thickness was set at 80 micrometer (μm). In the other case the co-extrusion layer thickness was set at 220 μm.

The extruded materials were measured for optical and multiaxial impact performance by means of flexed plate impact testing. For each material 5 plaques were tested.

TABLE 6

| Material | Optical properties | |
|---|---|---|
| | LT | Haze |
| PC | 89.8 | 0.16 |
| PC + 80 μm terpolymer | 89.4 | 0.15 |
| PC + 220 μm terpolymer | 89.0 | 0.21 |

Terpolymer co-extruded materials show like regular polycarbonate ductile fractures.

The polymer sheet materials were laminated with PVB (Butacite) between two Teflon coated sheets in a melt press. For the co-extruded materials the terpolymer layer was the contact surface with the PVB. The samples made for lamination were 4 mm window glass/PVB/PC sheet and PC sheet/PVB/1.8 mm disks identical to the ones used in example 2. In case the PC sheet was co-extruded material, the terpolymer layer was in contact with PVB. Lamination was done at 110° C. and 140° C. After lamination samples were submitted to the hydrolytic stability test (70° C., 95% RH) for a period of two weeks.

TABLE 7

| Lamination structure | Lamination condition | | Optical properties | |
|---|---|---|---|---|
| | Temperature (° C.) | Time (min.) | LT | Haze |
| 6 Glass/PVB/80 μm terpolymer-PC | 140 | 15 | 86.5 | 3.1 |
| 7 Glass/PVB/220 μm terpolymer-PC | | | 84.7 | 2.2 |
| 8 Glass/PVB/PC | | | 86.6 | 4.6 |
| 9 PC-80 μm terpolymer/PVB/ terpolymer disk (10 ppm H$_3$PO$_3$) | 110 | 5 | 83.3 | 2.6 |
| 10 PC-220 μm terpolymer/PVB/ terpolymer disk (10 ppm H$_3$PO$_3$) | | | 85.7 | 2.6 |
| 11 PC/PVB/PC disk | | | 88.3 | 3.5 |

Optical Properties Upon Hydrolytic Stability Test Exposure (70° C./95% Relative Humidity)

TABLE 8

| Lamination structure | 3 days exposure | | 7 days exposure | | 14 days exposure | |
|---|---|---|---|---|---|---|
| | LT | Haze | LT | Haze | LT | Haze |
| 6 | 82.2 | 30.6 | 74.5 | 39.2 | 65.4 | 59.5 |
| 7 | 84.9 | 5.9 | 84.7 | 5.6 | 83.4 | 6.5 |
| 8 | 80.4 | 38.3 | 72.9 | 52.8 | 62.6 | 75.9 |
| 9 | 85.1 | 9.6 | 78.1 | 29.5 | 67.3 | 55.6 |
| 10 | 85.4 | 2.9 | 84.2 | 4.6 | 81.8 | 6.9 |
| 11 | 83.1 | 38.2 | 69.4 | 65.3 | 56.0 | 89.5 |

The hydrolytic stability test shows that a terpolymer co-extrusion layer of 220 μm is sufficient for retention of optical properties. For materials containing a terpolymer co-extrusion layer of 80 μm, optical properties retention is observed to be in between results obtained with regular PC and 220 μm co-extrusion materials.

Example 4

In order to determine the effect of lamination temperature on adhesion and optical properties 2.75 mm thick polycarbonate sheet was produced with terpolymer co-extruded on top and bottom. The thickness of the co-extrusion was identical for both sides and selected thicknesses were 80 and 220 μm.

The composition of the materials used was identical to extrusion materials used in Example 3. The terpolymer formulation contained 4.9 wt % polycarbonate (Mw of about 28,000), 0.1 wt % PETS and 20 ppm phosphorous acid, and 0.8 wt % blue color master-batch.

Polymer sheet materials were laminated with PVB (Butacite) in between for a time period of 10 minutes between two Teflon coated alumina sheets. After cool down laminated structures were measured on optical properties. After this they are cut with a bandsaw into strips of about 2×8 centimeter (cm). Adhesion of the layers is judged by visual indication of delamination.

TABLE 9

| Lamination structure | Lamination temp. (° C.) | Optical properties (%) | | Adhesion upon bandsaw cutting |
|---|---|---|---|---|
| | | LT | Haze | |
| PC/PVB/PC | 110 | 87.0 | 4.6 | delamination |
| | 120 | 86.9 | 4.9 | delamination |
| | 130 | 86.9 | 4.6 | delamination |
| | 140 | 87.1 | 9.1 | good adhesion |
| 80 um terpol.-PC-80 μm terpol./PVB/ | 110 | 86.6 | 5.2 | good adhesion |
| 80 um terpol.-PC-80 μm terpol. | 120 | 86.7 | 4.5 | good adhesion |
| | 130 | 87.0 | 3.2 | good adhesion |
| | 140 | 86.7 | 9.7 | good adhesion |
| 220 um terpol.-PC-220 μm terpol./PVB/ | 110 | 84.7 | 4.5 | good adhesion |
| 220 um terpol.-PC-220 μm terpol. | 120 | 85.4 | 4.6 | good adhesion |
| | 130 | 78.2 | 5.5 | good adhesion |
| | 140 | 84.9 | 9.4 | good adhesion |

At a lamination temperature of 140° C. all laminated materials show increased haze values above 9%. It is believed that surface distortion is the cause of the increase in haze. The surface structure of the Teflon® %) coated alumina is copied on the skin of the laminated structure. This copy effect can happen while the lamination temperature is close to the glass transition temperature (Tg) of polycarbonate (PC Tg about 145° C.). At lamination temperatures lower than 140° C. the polycarbonate does not soften. It is believed that this is the cause of the observed delamination between polycarbonate and PVB upon cutting with the bandsaw. Since the terpolymer has a Tg of about 125° C. it softens at all lamination conditions resulting in improved adhesion with PVB.

Example 5

Solid polycarbonate (Mw of about 28,000) sheet was extruded at a thickness of 2 mm. This material was also used as core material for co-extrusion with BPA/HQ/MeHQ (33/34/33 mol %) terpolymer (Mw of about 27,000) on top. Keeping the total sheet thickness at about 2 mm, three co-extrusion layer thicknesses were selected. The selected co-extrusion layer thicknesses were 107, 170, and 215 μm. The extruded materials were measured for optical properties.

TABLE 10

| Material | Optical properties (%) | |
|---|---|---|
| | LT | Haze |
| PC | 89.5 | 0.32 |
| PC + 107 um terpolymer | 89.4 | 0.35 |
| PC + 170 um terpolymer | 89.3 | 0.37 |
| PC + 215 um terpolymer | 89.3 | 0.30 |

The polymer sheet materials were laminated with PVB (Butacite) between two Teflon coated sheets in a melt press. For the co-extruded materials the terpolymer layer was the contact surface with the PVB. Lamination was done in 15 minutes at 130° C. After lamination samples were submitted to the hydrolytic stability test (70° C., 95% RH) for a period of two weeks. Changes in optical properties were recorded by measuring light transmission and haze (ASTM D1003). At intermediate stages samples were taken out to measure impact retention via flexed plate impact.

TABLE 11

| Lamination structure | 0 days exposure | | 3 days exposure | | 7 days exposure | | 14 days exposure | |
|---|---|---|---|---|---|---|---|---|
| | LT (%) | Haze (%) | LT (%) | Haze (%) | LT (%) | Haze (%) | LT (%) | Haze (%) |
| PC/PVB/PC | 87.2 | 3.6 | 82.2 | 65.4 | 70.3 | 68.5 | 58.8 | 86.5 |
| PC-107 μm terpol/PVB/ 107 μm terpol-PC | 86.6 | 2.2 | 86.4 | 3.2 | 82.1 | 18.9 | 77.9 | 26.3 |
| PC-170 μm terpol/PVB/ 170 μm terpol-PC | 86.4 | 3.0 | 86.1 | 2.7 | 81.2 | 12.6 | 77.6 | 27.0 |
| PC-215 um terpol/PVB/ 215 μm terpol-PC | 86.3 | 2.8 | 86.2 | 2.9 | 82.1 | 11.5 | 78.3 | 23.9 | terpol = terpolymer

Like observed in Example 2, PVB laminated polycarbonate becomes very hazy and reduced light transmission is observed after 3 days of exposure in the hydrolytic stability test. After 7 days exposure the terpolymer co-extruded materials show a moderate increase in haze. For thicker laminated co-extrusion materials from Example 2 this increase in haze was not observed. Discrimination in performance between co-extruded materials could not be made. In other words, with the use of the terpolymer, the increase in haze of the multi-layered structure, was less than or equal to about 30%, or, more specifically, less than or equal to about 24%, even after 14 days of exposure to 70° C. and 95% RH, while the laminate without the terpolymer had an increase in haze of greater than 60% after a mere 3 days of exposure to the same conditions. After 3 days of exposure to these conditions, the lamination structure with the use of the terpolymer had an increase in haze of less than or equal to 10%, or, specifically, less than or equal to 5%, or, more specifically, less than or equal to 3%, and yet more specifically, less than or equal to 1%.

TABLE 12

| Laminate structure | Initial properties | | After 14 days climate test | | % impact retention on: | |
|---|---|---|---|---|---|---|
|  | [1]F max (N) | [2]E at max (J) | F max (N) | E at max (J) | F max (%) | E at max (%) |
| PC/PVB/PC | 13,256 | 196 | 6,590 | 57 | 49.7 | 29.3 |
| PC-107 μm terpol/PVB/PC-107 μm terpol | 12,985 | 173 | 7,446 | 68 | 57.3 | 39.3 |
| PC-170 μm terpol/PVB/PC-170 μm terpol | 11,896 | 150 | 8,612 | 71 | 72.4 | 47.6 |
| PC-215 μm terpol/PVB/PC-215 μm terpol | 10,842 | 125 | 7,966 | 68 | 73.5 | 54.7 |

[1]F max = maximum force at the flex plate impact test, measured in Newtons (N) (ISO 6603-2 (2000))
[2]E at max = energy at maximum deflection, measured in Joules (J)

Results on impact show a decrease of initial impact (not exposed) at increasing co-extrusion layer thickness. The impact performance of the polycarbonate/PVB/polycarbonate structure after 2 weeks exposure to the hydrolytic stability test is inferior compared to structures containing terpolymer as a barrier between PVB and polycarbonate. Additionally, a step improvement over PC may be attainable with a terpolymer thickness of greater than or equal to 110 micrometer (μm), or, specifically, greater than or equal to 125 micrometers, or, more specifically, greater than or equal to 150 micrometers, and yet more specifically, greater than or equal to 165 micrometers.

As is evident from the above data, the use of the terpolymer enables the use of adhesives such as PVB and EVA between glass/PC and polymer/PC laminates while substantially maintaining light transmission and haze properties. Additional advantages were attained with the impact retention.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

While the sheeting have been described with reference to exemplary embodiments, it will be understood by those skilled in the art that various changes may be made and equivalents may be substituted for elements thereof without departing from the scope. In addition, many modifications may be made to adapt a particular situation or material to the teachings of the sheeting without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A multilayer structure, comprising:
an initial terpolymer layer comprising
a polycarbonate terpolymer derived from a first dihydroxy compound, a second dihydroxy compound, and a third dihydroxy compound, wherein
the first dihydroxy compound has Structure (A)

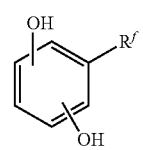

(A)

wherein $R^f$ is a hydrogen or $CH_3$;
the second dihydroxy compound has Structure (A) and is different from the first dihydroxy compound; and
the third dihydroxy compound does not have Structure (A), and wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer;
a second layer comprising plastic and/or glass;
a polycarbonate layer, wherein the initial terpolymer layer is located between the polycarbonate layer and the second layer; and an adhesive layer located between the initial terpolymer layer and the second layer, wherein the adhesive layer comprises a material selected from the group consisting of PVB, EVA, and combinations comprising at least one of the foregoing.

2. The multilayer structure of claim 1, wherein the polycarbonate terpolymer comprises hydroquinone, methyl hydroquinone, and BPA.

3. The multilayer structure of claim 1, further comprising an additional terpolymer layer, wherein the additional terpolymer layer comprises a second polycarbonate terpolymer comprising structures derived from the first dihydroxy compound, the second dihydroxy compound and the third dihydroxy compound; and wherein the second layer comprises polycarbonate, and wherein the initial terpolymer layer is in physical contact with both the polycarbonate layer and the adhesive layer, and the additional terpolymer layer is in physical contact with both the adhesive layer and the second layer.

4. The multilayer structure of claim 1, wherein the initial terpolymer layer is in physical contact with both the polycarbonate layer and the adhesive layer, and the adhesive layer is also in physical contact with the second layer.

5. The multilayer structure of claim 1, wherein the initial terpolymer layer further comprises phosphoric acid or phosphorous acid.

6. The multilayer structure of claim 5, wherein the initial terpolymer layer comprises about 1 ppm to about 15 ppm phosphoric acid or phosphorous acid.

7. The multilayer structure of claim 6, wherein the initial terpolymer layer comprises about 8 ppm to about 12 ppm phosphoric acid or phosphorous acid.

8. The multilayer structure of claim 5, wherein the initial terpolymer layer comprises a sufficient amount of the phosphoric acid or phosphorous acid to attain, in the multilayer structure, a flexed plate impact retention at maximum force of greater than or equal to about 65% after two weeks of exposure to 70° C. and 95% relative humidity.

9. The multilayer structure of claim 8, wherein the flexed plate impact retention is greater than or equal to about 85%.

10. The multilayer structure of claim 1, wherein the adhesive layer comprises PVB.

11. A method for making a multilayered structure, comprising:

disposing a initial terpolymer layer between a polycarbonate layer and an adhesive layer, wherein the initial terpolymer layer comprises a polycarbonate terpolymer derived from a first dihydroxy compound, a second dihydroxy compound, and a third dihydroxy compound, wherein the first dihydroxy compound has Structure (A)

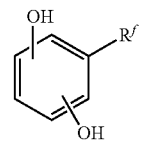

(A)

wherein $R^f$ is a hydrogen or $CH_3$;

the second dihydroxy compound has Structure (A) and is different from the first dihydroxy compound; and the third dihydroxy compound does not Structure (A), wherein a sum of mole percent of all of the first dihydroxy compound and the second dihydroxy compound is greater than or equal to 45% relative to a sum of mole percent of all of the first dihydroxy compound, the second dihydroxy compound, and the third dihydroxy compound in the polycarbonate terpolymer; and disposing a second layer on a side of the adhesive layer opposite the initial terpolymer layer, wherein the second layer comprises plastic and/or glass; and wherein the adhesive layer comprises a material selected from the group consisting of PVB, EVA, and combinations comprising at least one of the foregoing.

12. The method of claim 11, wherein disposing the initial terpolymer layer between the polycarbonate layer and the adhesive layer further comprises solution casting the initial terpolymer layer on the polycarbonate layer.

13. The method of claim 11, wherein disposing the initial terpolymer layer between the polycarbonate layer and the adhesive layer further comprises co-extruding the initial terpolymer layer and the polycarbonate layer.

14. The method of claim 11, wherein the initial terpolymer layer comprises a polycarbonate formed from hydroquinone, methyl hydroquinone, and BPA, and wherein disposing the initial terpolymer layer between the polycarbonate layer and the adhesive layer further comprises co-extruding the adhesive layer between the initial terpolymer layer and an additional terpolymer layer.

15. The method of claim 11, wherein the initial terpolymer layer further comprises phosphoric acid or phosphorous acid.

16. The method of claim 15, wherein the initial terpolymer layer comprises about 5 ppm to about 15 ppm phosphoric acid or phosphorous acid.

17. The method of claim 16, wherein the initial terpolymer layer comprises about 8 ppm to about 12 ppm phosphoric acid or phosphorous acid.

18. The method of claim 15, wherein the initial terpolymer layer comprises a sufficient amount of the phosphoric acid or phosphorous acid to attain, in the multilayer structure, a flexed plate impact retention at maximum force of greater than or equal to about 65% after two weeks of exposure to 70° C. and 95% relative humidity.

19. The method of claim 11, wherein the adhesive layer comprises PVB.

* * * * *